United States Patent [19]
Maeno et al.

[11] Patent Number: 5,316,275
[45] Date of Patent: May 31, 1994

[54] HYDRAULIC DAMPING DEVICE

[75] Inventors: Takashi Maeno; Tatsuo Suzuki, both of Inazawa, Japan

[73] Assignee: Toyota Gosei Co., Ltd., Nishikasugai, Japan

[21] Appl. No.: 982,676

[22] Filed: Nov. 30, 1992

[30] Foreign Application Priority Data

Dec. 13, 1991 [JP] Japan .................. 3-110001

[51] Int. Cl.$^5$ .................................................. F16F 9/00
[52] U.S. Cl. ................................ 267/140.13; 267/219
[58] Field of Search .................... 267/140.11-140.13, 267/35, 219; 248/562, 636; 180/300, 312

[56] References Cited

U.S. PATENT DOCUMENTS

| | | | |
|---|---|---|---|
| 4,660,813 | 4/1987 | Reuter | 267/140.13 |
| 4,721,292 | 1/1988 | Saito | 267/140.13 |
| 4,858,879 | 8/1989 | Miyamoto et al. | 248/562 |
| 4,889,325 | 12/1989 | Flower et al. | 267/219 |
| 5,178,374 | 1/1993 | Maeno | 267/140.13 |
| 5,183,243 | 2/1993 | Matsumoto | 267/140.13 |

Primary Examiner—Douglas C. Butler
Assistant Examiner—Chris Schwartz
Attorney, Agent, or Firm—Cushman, Darby & Cushman

[57] ABSTRACT

A hydraulic damping device is provided having a rubber elastic body, a rubber film member closing an opening of the rubber elastic body so as to define a closed chamber, and a partition member dividing the closed chamber into two liquid chambers. A restricted liquid passageway interconnects the two liquid chambers. A cylindrical frame member composed of a resin material having a low coefficient of thermal conductivity is joined to the outer peripheral surface of the rubber elastic body. A support member composed of an aluminum alloy is secured to the outer peripheral surface of the frame member and is connected to an engine. When the support member receives a large amount of heat from the engine, the rubber elastic body is thermally insulated from the support member by virtue of the resin frame member, and accordingly, can be prevented from deteriorating due to the heat of the engine. In addition, by composing the support member of an aluminum alloy, the weight of the device can be reduced.

6 Claims, 2 Drawing Sheets

HYDRAULIC DAMPING DEVICE

BACKGROUND OF THE INVENTION

1. Field of the Invention

The present invention relates to a hydraulic damping device, and more particularly to a lightweight hydraulic damping device which exhibits excellent durability when exposed to heat.

2. Description of Related Art

One example of a conventional hydraulic damping device is disclosed in U.S. Pat. No. 4,858,879. In this conventional device, as shown in FIG. 3, a metallic support member 12 is embedded in the axially central portion of a thick rubber elastic body 10 which has a hollow conical configuration and opens downward. The support member 12 is connected by a bolt 14 to a bracket 15 fixed to a vibrating body (not shown), such as an engine.

A cylindrical side plate 16 composed of a metallic plate is joined to an outer peripheral surface of the rubber elastic body 10. An opening defined by a lower end of the side plate 16 is closed with a partition member 18 to define a main liquid chamber 20 with the rubber elastic body 10. A thin rubber film 24 is provided under the partition member 18 to define an auxiliary liquid chamber 26 with the partition member 18. A restricted liquid passageway 22 is defined at an axial center of the partition member 18 for interconnecting the main liquid chamber 20 and the auxiliary liquid chamber 26.

A lower end edge of the side plate 16 is secured by caulking to an upper end edge of a cylindrical support member 28. A lower end edge of the support member 28 is connected by a bolt 30 to a vehicle frame 29.

An annular stopper member 31 is fixed to the support member 12 so as to be opposed to the upper half of the rubber elastic body 10 with a predetermined spacing. An annular cover 311 is attached to a peripheral edge of the stopper member 31 so as to surround the rubber elastic body 10.

Reference numeral 13 designates a ring member embedded within the rubber elastic body 10 for preventing buckling of the rubber elastic body 10, and 312 designates an annular pad member which is attached to the under surface of the stopper member 31 so as to be brought into contact with the peripheral surface of the rubber elastic body 10 above the ring member 13.

With the above-described example of the conventional device, by virtue of the cover 311, damage of the rubber elastic body 10 due to radiation heat or thermal effects by the engine can be prevented. However, the provision of the cover 311 results in an undesirable increase in the number of parts, and accordingly, an undesirable increase in the weight of the device.

SUMMARY OF THE INVENTION

It is an object of the present invention to provide a lightweight hydraulic damping device which exhibits excellent durability when exposed to heat.

The hydraulic damping device in accordance with the present invention has a cup-shaped thick rubber elastic body, a thin rubber film closing an opening of the rubber elastic body to define a closed chamber, a partition member dividing the closed chamber into two liquid chambers, which includes a restricted liquid passageway interconneting these liquid chambers, a support member connecting the rubber elastic body to a vibrating body, and a frame member made of a resin material having a low coefficient of thermal conductivity, which is interposed between the support member and the rubber elastic body, so as to limit heat transfer to the rubber elastic body.

With the device having the above-described constitution, when the support member receives a large amount of heat from the engine, the resin formed frame member having a low coefficient of thermal conductivity, sufficiently prevents heat transmission to the rubber elastic body. As a result, the rubber elastic body is prevented from deteriorating. Furthermore, the weight of the device can be reduced by virtue of the support members being formed of an aluminum alloy.

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
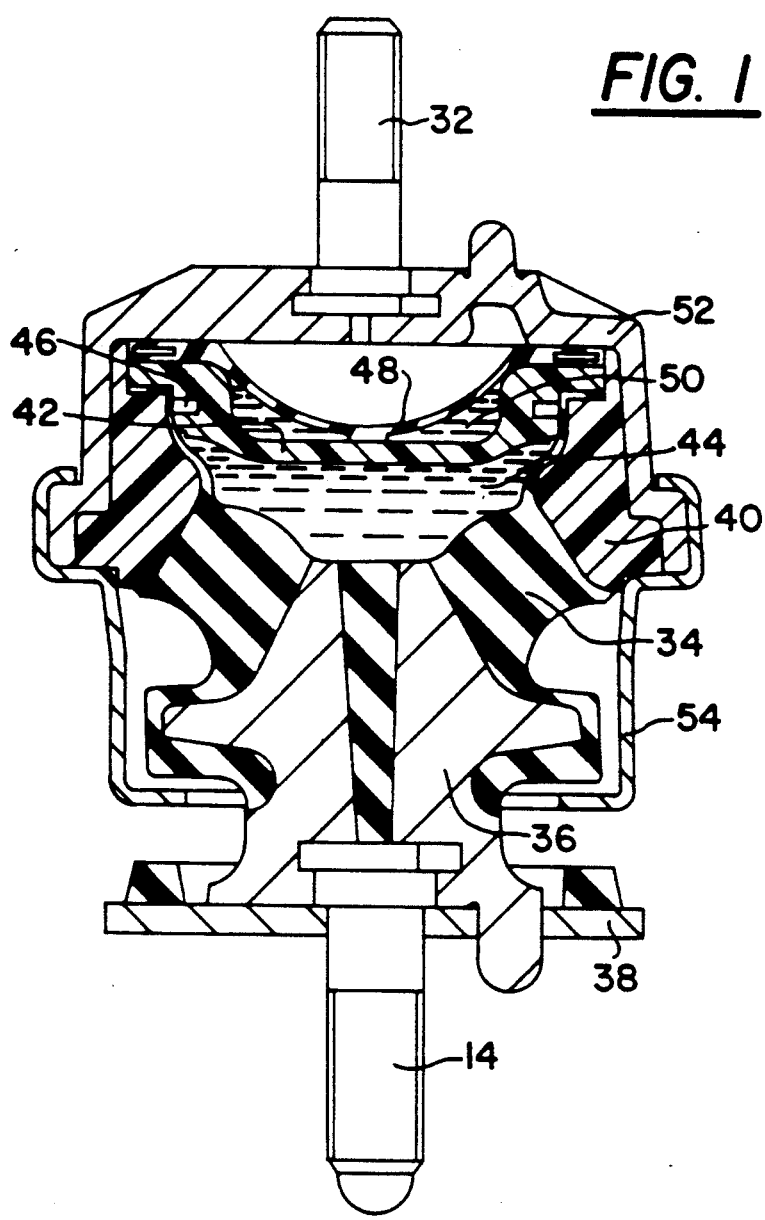
FIG. 1 is an overall cross-sectional view of one embodiment of a hydraulic damping device provided in accordance with the principles of the present invention.

FIG. 1 illustrates one embodiment of a hydraulic damping device provided in accordance with the principles of the present invention. In the drawing, a cylindrical support member 36, made of aluminum alloy, is embedded in the axially central portion of a rubber elastic body 34. A stopper plate 38 is joined to a lower surface of the support member 36, and is connected by a bolt 14 to a base body (not shown), such as a vehicle frame.

A cylindrical frame member 40 is joined to an outer peripheral surface of the rubber elastic body 34. The frame member 40 is composed of a resin material having a low coefficient of thermal conductivity, such as Nylon 66. The inner peripheral surface of the frame member 40 to which the rubber elastic body 34 is joined, is curved into a predetermined configuration, whereas the outer peripheral surface thereof is flat except for a circumferentially extending stepped portion.

An opening defined by an upper edge of the cylindrical frame member 40 is closed with a partition member 42 to define a main liquid chamber 44 with the rubber elastic body 34. A restricted liquid passageway 46 is defined along the outer peripheral surface of the partition member 42 for interconnecting the main liquid chamber 44 and an auxiliary liquid chamber 50 defined by the partition member 42 and a thin rubber film 48 which is provided over the partition member 42.

A support member 52 having a cup-like configuration and made of aluminum alloy is provided so as to cover the frame member 40. The inner peripheral surface of the support member 52 has a configuration conforming to the outer peripheral surface of the frame member 40. A lower edge of the support member 52 is secured to the frame member 40 by joining with caulking, an upper edge of a cylindrical stopper member 54. The support member 52 is connected to an engine (not shown) as the vibrating body by a bolt 32.

The rubber elastic body 34 is vulcanized to the frame member 40 when the rubber elastic body 34 is molded.

Figure 2:
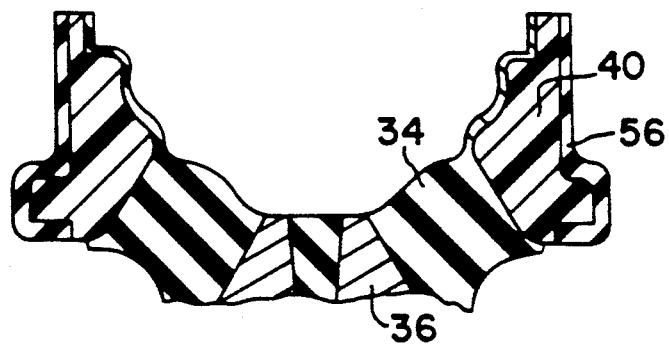
FIG. 2 is a cross-sectional view of a frame member employed in another embodiment of a hydraulic damping device of the invention.
Figure 3:
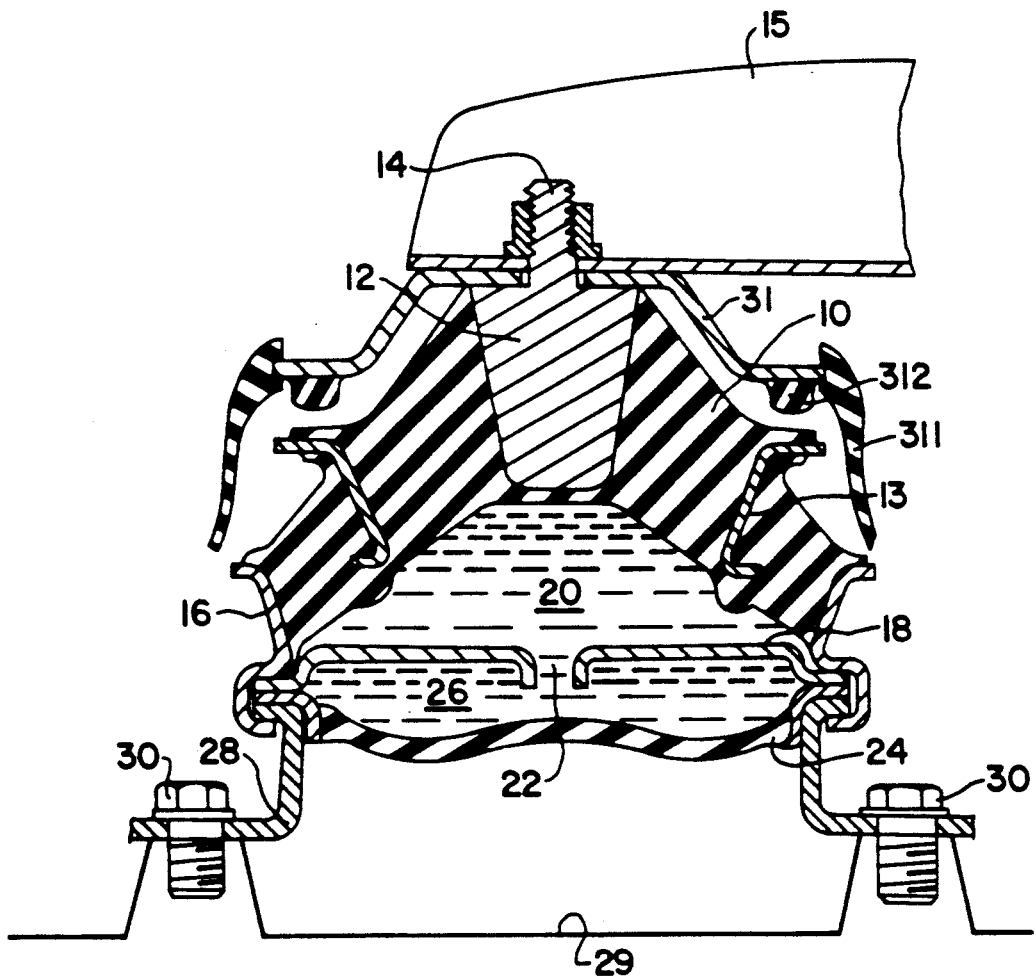
FIG. 3 is an overall cross-sectional view of a conventional hydraulic damping device.

In another embodiment of frame member 40, as shown in FIG. 2, a rubber layer 56 is provided along the outer peripheral surface of the frame member 40. Preferably, the rubber layer 56 and the rubber elastic body 34 are integrally formed by injection molding.

With the present embodiment, the injection pressure around the frame member 40 can be made uniform. Accordingly, the frame member 40 composed of resin can be prevented from being cracked. Rubber layer 56 may be eliminated upon assembling the device, or may be used in assembly as a sealing rubber layer for the damping liquid.

With the hydraulic damping device having the above-described constitution, the rubber elastic body 34 deforms in accordance with the input of vibrations, whereby damping liquid flows by way of the restricted liquid passageway 46 to perform effective vibration-damping operation.

In addition, the weight of the device can be reduced because the support member 52 and other metallic parts are made of an aluminum alloy. Furthermore, the rubber elastic body 34 can be prevented from thermally deteriorating because the frame member 40, comprised of resin having a low coefficient of thermal conductivity, is interposed between the support member 52 and the rubber elastic body 34.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A hydraulic damping device comprising:
   a rubber elastic body having a cup-shaped opening;
   a resilient rubber film member closing said cup-shaped opening of said rubber elastic body to define a closed chamber;
   a partition member disposed between said rubber film member and said rubber elastic body to divide said closed chamber into two liquid chambers, said partition member including a restricted liquid passageway interconnecting said two liquid chambers;
   a support member connecting said rubber elastic body to a vibrating body; and
   a cylindrical frame member interposed between said support member and said rubber elastic body, said frame member being composed of a resin material having a coefficient of thermal productivity so as to limit heat transfer to the rubber elastic body, an inner peripheral surface of said cylindrical frame member being joined to an outer peripheral surface of said rubber elastic body, an outer peripheral surface of said cylindrical frame member being covered entirely by said support member.

2. The hydraulic damping device according to claim 1, wherein said support member is composed of an aluminum alloy.

3. The hydraulic damping device according to claim 1, wherein said support member is secured to said outer peripheral surface of said frame member.

4. The hydraulic damping device according to claim 1, further comprising a rubber layer formed along an outer peripheral surface of said frame member.

5. The hydraulic damping device according to claim 4, wherein said rubber elastic body and said rubber layer are integrally formed by injection molding.

6. The hydraulic damping device according to claim 1, wherein said outer peripheral surface of said cylindrical frame member has a circumferentially extend stepped portion, and said support member has an inner peripheral surface which substantially conforms to said outer peripheral surface of said cylindrical frame member.

* * * * *